United States Patent
Kozak (10) Patent No.: US 6,415,226 B1
(45) Date of Patent: Jul. 2, 2002

(54) METHOD AND SYSTEM FOR PROVIDING SAFE ROUTES USING A NAVIGATION SYSTEM

(75) Inventor: Frank J. Kozak, Naperville, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/467,609

(22) Filed: Dec. 20, 1999

(51) Int. Cl.⁷ .............................................. G06F 19/00
(52) U.S. Cl. ....................... 701/210; 701/208; 340/988; 340/990; 340/995
(58) Field of Search ................................ 701/210, 208, 701/507, 117; 340/988, 990, 995; 73/178 R; 342/357.01

(56) References Cited

U.S. PATENT DOCUMENTS

| | | | |
|---|---|---|---|
| 4,754,402 A | * | 6/1988 | Wand |
| 4,829,434 A | * | 5/1989 | Karmel et al. |
| 5,146,219 A | * | 9/1992 | Zechnall |
| 5,220,497 A | * | 6/1993 | Trovato et al. |
| 5,243,524 A | * | 9/1993 | Ishida et al. |
| 5,247,440 A | * | 9/1993 | Capurka et al. |
| 5,315,295 A | * | 5/1994 | Fujii |
| 5,390,118 A | * | 2/1995 | Margolis et al. |
| 5,408,411 A | * | 4/1995 | Nakamura et al. |
| 5,420,794 A | * | 5/1995 | James |
| 5,448,487 A | * | 9/1995 | Arai |
| 5,485,161 A | * | 1/1996 | Vaughn |
| 5,485,381 A | * | 1/1996 | Heintz et al. |
| 5,504,482 A | * | 4/1996 | Schreder |
| 5,539,397 A | * | 7/1996 | Asanuma et al. |
| 5,546,311 A | * | 8/1996 | Sekine ........................ 701/208 |
| 5,570,087 A | * | 10/1996 | Lemelson |
| 5,572,449 A | * | 11/1996 | Tang et al. |

(List continued on next page.)

FOREIGN PATENT DOCUMENTS

| EP | 0 745 788 A1 | 4/1996 |
|---|---|---|
| EP | 0 795 700 A2 | 9/1997 |

OTHER PUBLICATIONS

Casparsson et al. "Volcano a revolution in on–board communications," (1998) http://www.tech2.volvo.se/reportage/9811volsano/main.htm.

Melin, "Volvo S80 Electrical system of the future," (1998) http://www.tech2.volvo.se/reportage/9811electrical/main.htm.

Primary Examiner—William A. Cuchlinski, Jr.
Assistant Examiner—Olga Hernandez
(74) Attorney, Agent, or Firm—Frank J. Kozak; Jon D. Shutter (57) ABSTRACT

A feature for a motor vehicle that includes a navigation system and one or more safety systems that detect an area around the vehicle. The navigation system uses geographic data and the one or more safety systems also use geographic data. The feature advises the vehicle driver to travel along roads that are represented by data that enables operation of the one or more safety systems. According to one embodiment, when the navigation system is requested to calculate a route to a destination, the navigation system favors roads that are represented by geographic data that enables operation of the one or more of the safety systems. According to another embodiment, the feature is implemented interactively, while the vehicle is being driven, by indicating which paths ahead of the vehicle are favored as being represented by data that enables operation of the one or more safety systems. According to yet another embodiment, the feature is implemented heuristically to advise the driver of alternative routes to commonly visited destinations wherein the alternative routes favor roads represented by data that enable use of the one or more safety systems.

26 Claims, 8 Drawing Sheets

U.S. PATENT DOCUMENTS

| | | | | |
|---|---|---|---|---|
| 5,774,362 A | * | 6/1998 | Suzuki et al. | 701/208 |
| 5,808,565 A | * | 9/1998 | Matta et al. | 340/994 |
| 5,819,200 A | * | 10/1998 | Tamai et al. | 701/208 |
| 5,839,087 A | * | 11/1998 | Sato | 701/207 |
| 5,893,898 A | * | 4/1999 | Tanimoto | 701/201 |
| 5,899,955 A | * | 5/1999 | Yagyu et al. | 701/209 |
| 5,919,245 A | * | 7/1999 | Nomura | 701/207 |
| 5,928,305 A | * | 7/1999 | Nomura | 701/207 |
| 5,968,109 A | * | 10/1999 | Israni et al. | 701/208 |
| 6,038,509 A | * | 3/2000 | Poppen et al. | 701/210 |
| 6,108,604 A | * | 8/2000 | Fukaya et al. | 701/211 |
| 6,144,919 A | * | 11/2000 | Ceylan et al. | 701/208 |
| 6,154,152 A | | 11/2000 | Ito | |
| 6,161,071 A | * | 12/2000 | Shuman et al. | 701/48 |
| 6,166,739 A | * | 12/2000 | Hugh | 345/357 |
| 6,169,955 B1 | * | 1/2001 | Fultz | 701/200 |
| 6,173,232 B1 | * | 1/2001 | Nanba et al. | 701/209 |
| 6,173,277 B1 | * | 1/2001 | Ashby et al. | 707/1 |
| 6,184,823 B1 | * | 2/2001 | Smith et al. | 342/357.13 |
| 6,192,309 B1 | * | 2/2001 | Prestl et al. | 701/93 |
| 6,192,312 B1 | * | 2/2001 | Hummelsheim | 701/118 |
| 6,192,314 B1 | * | 2/2001 | Khavakh et al. | 701/209 |

* cited by examiner

FIG. 5      *more data in FIGS. 6A and 6B*

|   | NAME | DESCRIPTION |
|---|---|---|
| 1 | LEVEL OF DIGITIZATION | HIGH, CONNECTING SEGMENT, DETAILED CITY COVERAGE, ROAD NETWORK COVERAGE, INTERTOWN COVERAGE |
| 2 | STREET NAME | PREFERRED STREET NAME OF SEGMENT. MAY BE EMPTY IF SEGMENT HAS NO NAME. |
|   | COUNTRY CODE | COUNTRY CODE (44=UK, 49=GERMANY, ...) |
| 3 | LONGITUDE | |
| 4 | LATITUDE | |
| 5 | ALTITUDE | ALTITUDE ABOVE SEA LEVEL. COLLECTED TO DGPS ACCURACY. |
| 6 | LOWER AND UPPER BOUNDS FOR NUMBER OF LANES | LOWER AND UPPER BOUNDS FOR NUMBER OF LANES BEFORE AND AFTER CURRENT POINT (TO APPROXIMATE MERGING LANES). |
| 7 | REST AREA | CURRENT POINT WITHIN OR OUTSIDE A REST AREA, OR AT CURRENT POINT REST AREA STARTS AND ENDS? |
| 8 | PARKING AREA | CURRENT POINT WITHIN OR OUTSIDE A PARKING AREA OR AT CURRENT POINT PARKING AREA STARTS OR ENDS? |
| 9 | EMERGENCY LANE | EMERGENCY LANE AT THE CURRENT POINT? |
| 10 | PHYSICAL LANE DIVIDER | PHYSICAL LANE DIVIDER ON THE ROAD |

FIG. 6A

|    | NAME | DESCRIPTION |
|----|------|-------------|
| 11 | FOREST | TREES OR FOREST WITHIN A SPECIFIED DISTANCE OF THE ROAD'S BOUNDARIES? |
| 12 | MAXIMUM ALLOWABLE SPEED | THE MAXIMUM SPEED IS WITHIN THE RANGE [I..J]. UNIT IS KM/H. |
| 13 | ACCELERATION LANE | CURRENT POINT ON OR NEXT TO AN ACCELERATION LANE? |
| 14 | TUNNEL/ UNDERPASS | CURRENT POINT INSIDE A TUNNEL? |
| 15 | BRIDGE/ OVERPASS | CURRENT POINT ON A BRIDGE? |
| 16 | LEVEL CROSSING | CURRENT POINT IN A LEVEL CROSSING REGION? |
| 17 | PASSING ALLOWED | POINT IN PASSING ZONE, OUTSIDE OF PASSING ZONE, BEGINNING OR END OF PASSING ZONE? |
| 18 | TRAFFIC LIGHT | TRAFFIC LIGHT AT THE CURRENT POINT? |
| 19 | YIELD SIGN | YIELD SIGN AT THE CURRENT POINT? |
| 20 | ENTER CITY SIGN | "ENTERING CITY" SIGN AT THE CURRENT POINT? |
| 21 | EXIT CITY SIGN | "EXITING CITY" SIGN AT THE CURRENT POINT? |
| 22 | NUMBER OF LANES | IN DIRECTION |
| 23 | LANE WIDTH | OF EACH LANE |
| 24 | ROAD SURFACE | PAVED, GRAVEL, DIRT, GROOVED |
| 25 | BIKE LANE | PRESENT |

METHOD AND SYSTEM FOR PROVIDING SAFE ROUTES USING A NAVIGATION SYSTEM

BACKGROUND OF THE INVENTION

The present invention relates to a feature for a motor vehicle that advises the vehicle driver to travel on roads on which other safety systems of the motor vehicle are enabled.

Various new safety systems have been developed for automobiles using technologies that sense the area around the automobile. Examples of some new safety systems for automobiles include automatic headlight aiming, adaptive cruise control, obstacle warning, curve warning, intersection warning, lane departure warning, collision warning, and adaptive transmission shift control. The automatic headlight aiming system detects when the vehicle is approaching a curve and adjusts the vehicle's headlights, i.e., width, rotational angle, elevation angle, and brightness, based on the curvature of the road ahead of the vehicle, tilt, elevation change, and other factors. The adaptive cruise control system maintains and/or resumes a set speed or safe following distance from other vehicles at slower than the set speed based on data about vehicle speed, nearby vehicles and other obstructions, type of road being traveled (motorway vs. local road), road curvature, tilt, elevation, and other factors. The obstacle warning system detects objects around the vehicle and provides warnings about the obstacles to the vehicle driver. The curve warning system detects upcoming curves along the vehicle path and provides warnings to the vehicle driver if the vehicle speed is excessive given the road conditions. The intersection warning system detects upcoming intersections along the vehicle path and provides warnings to the driver if appropriate. The lane departure warning system detects when the vehicle has departed from a lane and provides warnings to the driver as appropriate. The adaptive shift system control adjusts the gearing and shifting of automatic transmissions based on sensor data about vehicle speed, engine speed, road curvature, tilt, elevation, and other factors. There are other vehicle safety systems in addition to these.

These vehicle safety systems use a variety of sensor mechanisms in the vehicle to detect the current state of the vehicle and detect the current state of the roadway in front of the vehicle. These sensor mechanisms may include radar and vision-oriented sensors, such as cameras. Although radar and vision-oriented sensors are important components of vehicle safety systems, these components have limitations. The range and/or accuracy of radar or vision-oriented sensors can be affected by certain environmental conditions, such as fog, heavy rain or snow, or snow-covered roads. Moreover, radar and vision-oriented systems do not reliably detect certain useful road attributes, such as speed limits, traffic signs, bridge crossings, etc. Further, radar and vision-oriented sensors cannot "see" around corners or other obstructions and therefore may be limited under such circumstances.

One way to address the limitations of radar and vision-oriented systems is to use digital map data as an additional component in these vehicle safety systems. Digital map data can be used in vehicle safety systems to provide information about the road ahead or around the vehicle. Digital map data is not affected by environmental conditions, such as fog, rain or snow. In addition, digital map data can provide useful information that cannot reliably be provided by vision-oriented systems, such as speed limits, traffic and lane restrictions, etc. Further, digital map data can be used to determine the road ahead of the vehicle even around corners or beyond obstructions. Accordingly, digital map data can be a useful addition in vehicle safety systems.

Although digital map data can be used as an additional component in vehicle safety systems, issues remain to be addressed before digital map data can be widely used for such purposes. For example, there is a need to efficiently handle the relatively large amount of digital map data required for vehicle safety systems. In addition, different vehicle safety systems require different types and quantities of digital map data and therefore there is a need to provide those digital map data needed by the various vehicle safety systems.

SUMMARY OF THE INVENTION

To address these and other objectives, the present invention comprises a feature for a motor vehicle that includes a navigation system and one or more safety systems that detect the area around the vehicle. The navigation system uses geographic data and the one or more safety systems also use geographic data. The feature advises the vehicle driver to travel along roads that are represented by data that enables operation of the one or more safety systems. According to a first aspect, when the navigation system calculates a route to a destination, the navigation system favors roads that are represented by geographic data that enables operation of the one or more of the safety systems.

According to another aspect, the feature is implemented interactively, while the vehicle is being driven, by indicating which paths ahead of the vehicle are favored as being represented by data that enables operation of the one or more safety systems.

According to yet another aspect, the feature is implemented heuristically to advise the driver of alternative routes to commonly visited destinations wherein the alternative routes favor roads represented by data that enable use of the one or more safety systems.

DETAILED DESCRIPTION OF THE PRESENTLY PREFERRED EMBODIMENTS

I. Vehicle Navigation and Safety Systems

A. Overview of data architecture

Figure 1:
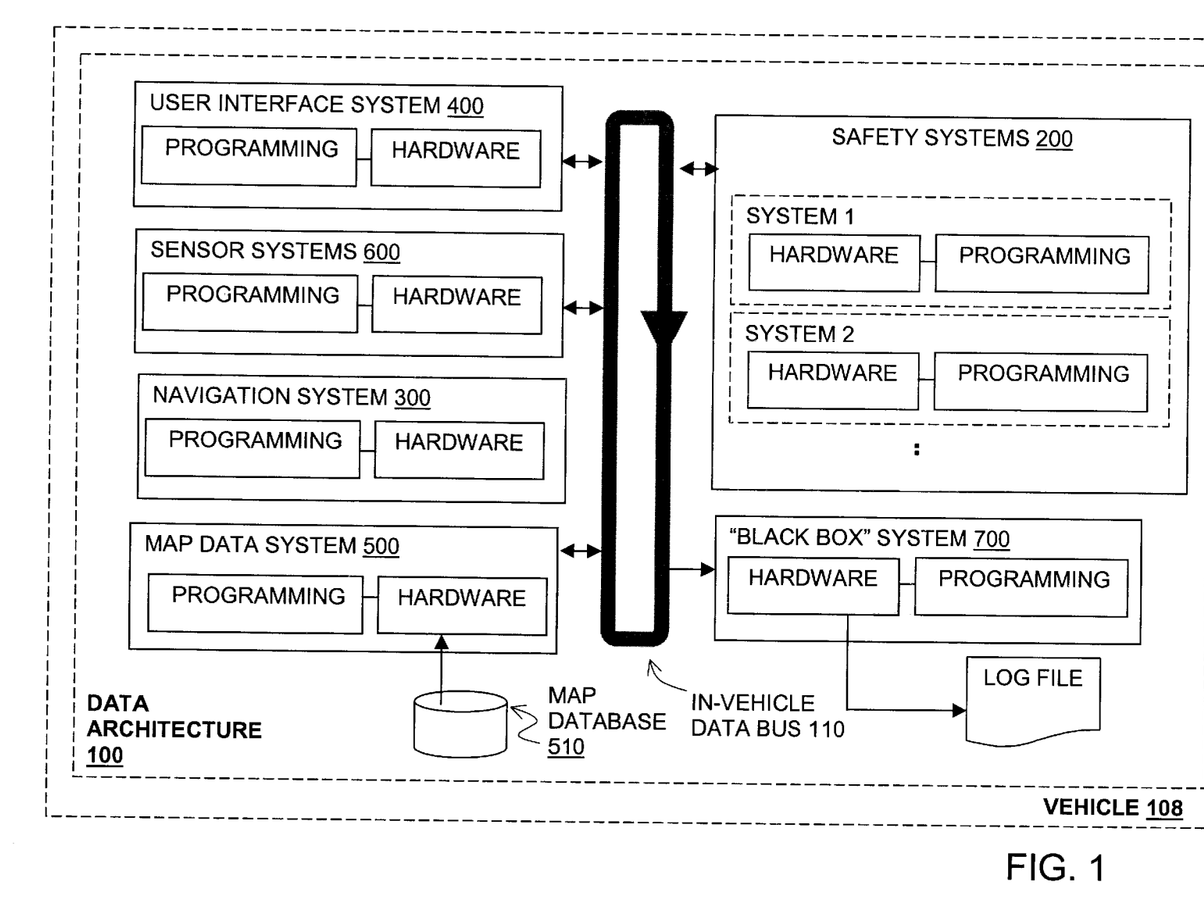
FIG. 1 is a block diagram of a data architecture for a motor vehicle that includes a first embodiment.

Referring to FIG. 1, there is a block diagram illustrating a data architecture 100 for a vehicle 108. The data architecture 100 provides for the exchange of data between various systems in the vehicle 108. The systems in the vehicle 108 that can exchange data include vehicle safety systems 200, a navigation system 300, a user interface system 400, a map database system 500, sensor systems 600 and a traveling log ("black box") system 700. There may be systems in the vehicle 108 in addition to those shown in FIG. 1. Additional systems may include an entertainment system, a (wireless) communication system, business systems (e.g., email), and so on. Each of these systems, 200, 300, 400, 500, 600, 700, as well as any additional systems, includes appropriate hardware and software that supports the functions provided thereby. Each system may have its own one or more processors, ECU's (electronic control units), or other computing units, controllers, memory, data storage, etc. In some embodiments, some of these systems may share hardware and software resources. According to one embodiment of the data architecture shown 100 in FIG. 1, the systems exchange data over one or more data buses 110 that include appropriate hardware and software for addressing devices, data arbitration, etc. Suitable embodiments of the data architecture shown in FIG. 1 are described in the copending patent applications, Ser. No. 09/268,162, filed Mar. 12, 199, filed on even date herewith, the entire disclosures of which are incorporated by reference herein.

B. The safety systems

Figure 2:
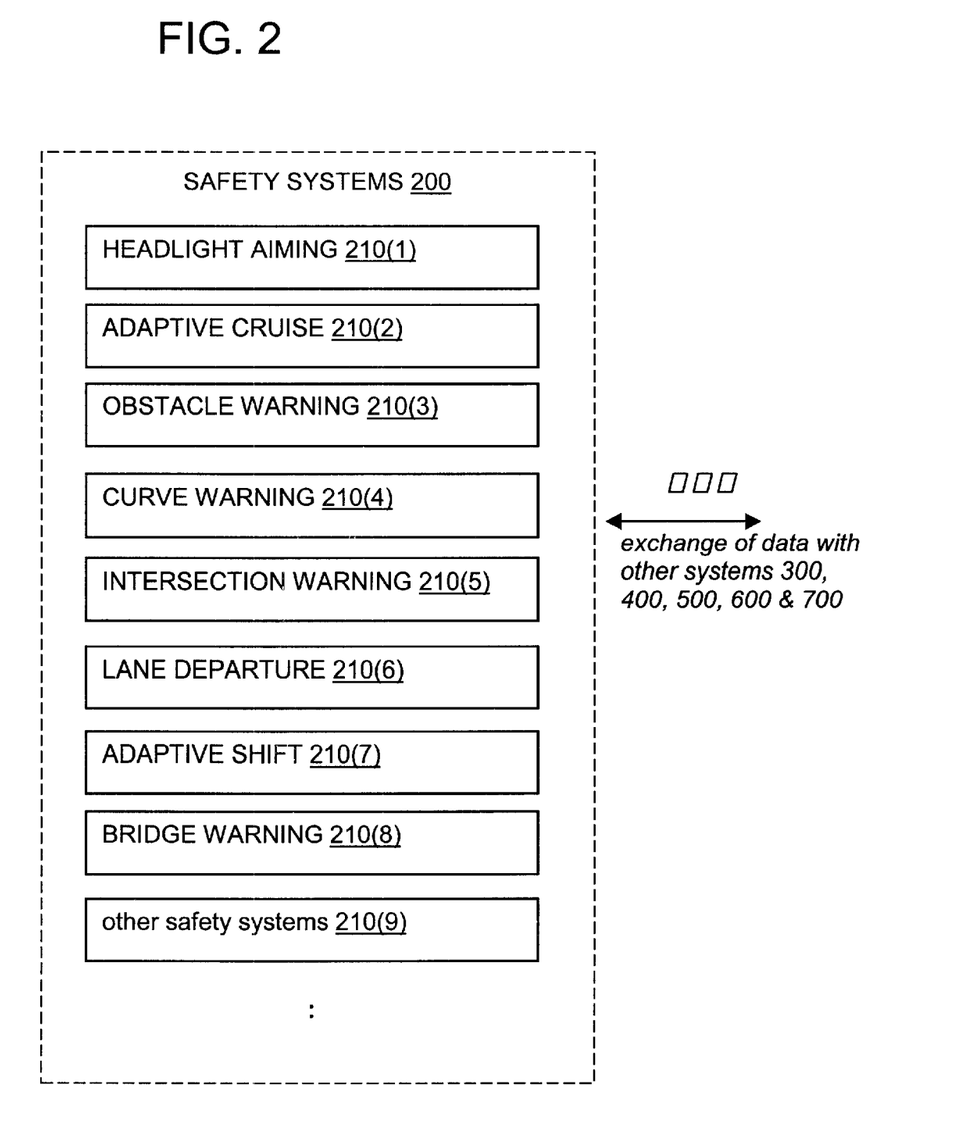
FIG. 2 is a block diagram illustrating some of the safety systems included among the safety systems shown in FIG. 1.

FIG. 2 shows some of the systems included among the safety systems 200 of FIG. 1. The vehicle 108 can include any one or more of the systems shown in FIG. 2 or the vehicle can include different types of safety systems. Included among the safety systems 200 are an automatic headlight aiming system 210(1), an adaptive cruise control system 210(2), an obstacle warning system 210(3), a curve warning system 210(4), an intersection warning system 210(5), a lane departure warning system 210(6), an adaptive shift control system 210(7), and a bridge warning system 210(8). Each of these systems is briefly described.

The automatic headlight aiming system 210(1) receives data indicating the vehicle position and vehicle speed from other components and/or systems within the vehicle, such as the navigation system 300 and sensor systems 600. The automatic headlight aiming system 210(1) also obtains data about the road curvature from the map database system 500. Based on these inputs, the automatic headlight aiming system 210(1) adjusts the vehicle's headlights (i.e., width, rotational angle, elevation angle, and brightness) based on the curvature, tilt, and elevation change of the road ahead of the vehicle, and other factors.

The adaptive cruise control system 210(2) receives data indicating the vehicle position and speed from the navigation system 300 and the sensor system 600. The adaptive cruise control system 210(2) also obtains data about the road ahead of the vehicle from the map database system 500. The data obtained from the map database system 500 includes information about road curvature, legal vehicular speeds, intersections, hills, etc. Based on these inputs, the adaptive cruise control system 210(2) maintains and/or resumes a set speed or safe following distance from other vehicles at slower than the set speed based on data about the vehicle speed, nearby vehicles and other obstructions, type of road traveled (motorway vs. local road), road curvature, tilt, elevation, and other factors.

The obstacle warning system 210(3) receives data indicating the vehicle position from the navigation system 300 and data about objects that are detected around the vehicle from the sensor system 600. The obstacle warning system 210(3) also obtains data about the road ahead of the vehicle from the map database system 500. The data obtained from the map database system 500 includes information about obstacles, such as bridge abutments, signs, overpasses, etc. Based on these inputs, the obstacle warning system 210(3) detect objects around the vehicle and provides warnings to the vehicle driver about the detected obstacles along the vehicle path.

The curve warning system 210(4) receives data indicating the vehicle position from the navigation system 300. The curve warning system 210(4) receives data indicating the vehicle speed, road conditions, weather conditions, and ambient light conditions from the sensor systems 600. The curve warning system 210(4) also obtains data about the road curvature along the road ahead of the vehicle from the map database system 500. Using these inputs, the curve warning system 210(4) detects upcoming curves along the vehicle path and provides warnings to the vehicle driver if the vehicle speed is excessive for the upcoming curve given the road conditions.

The intersection warning system 210(5) receives data indicating the vehicle position from the navigation system 300 and data indicating the vehicle speed from the sensor systems 600. The intersection warning system 210(5) also obtains data about upcoming intersections from the map database system 500. The intersection warning system 210 (5) detects upcoming curves along the vehicle path and provides warnings to the vehicle driver as upcoming curves are approached.

The lane departure warning system 210(6) receives data indicating the vehicle position from the navigation system 300 and data indicating the speed and heading from the sensor systems 600. The lane departure warning system 210(6) also obtains data about lane width, number of lanes, etc., from the map database system 500. Based on these inputs, the lane departure warning system 210(6) detects when the vehicle has departed from a lane and provides warnings to the driver as appropriate.

The adaptive shift control system 210(7) receives data indicating the vehicle position from the navigation system 300 and data indicating the vehicle speed engine speed, tilt, elevation, heading and possibly other data from the sensor systems 600. The adaptive shift system control system 210(7) also obtains data about road curvature, altitude changes, speed limit changes, etc., from the map database system 500. Based on these inputs, the adaptive shift control system 210(7) adjusts the gearing and shifting of automatic transmissions in order to increase engine performance, improve gas mileage, and accomplish other benefits.

The bridge warning system 210(8) receives data indicating the vehicle position from the navigation system 300. The bridge warning system 210(8) receives data indicating vehicle speed, road conditions, weather conditions, and ambient light conditions from the sensor systems 600. The bridge warning system 210(8) also obtains data about the locations of bridges from the map database system 500. Based on these inputs, the bridge warning system 210(8) provides a warning to the vehicle driver when the vehicle is about to cross a bridge if appropriate.

In addition to the safety systems shown in FIG. 2, the vehicle 108 may include other safety systems. These other safety systems may also use input from the sensor systems 600, the navigation system 300 and the map database system 500.

C. The navigation system

The navigation system 300 provides navigation-related resources. These resources can be used by the vehicle user and/or passengers. The navigation system 300 can also be used by other systems in the vehicle that require navigation-related resources. Included among the resources provided by the navigation system 300 are vehicle positioning, route calculation and guidance, map display, electronic yellow pages, and possibly other features.

Figure 3:
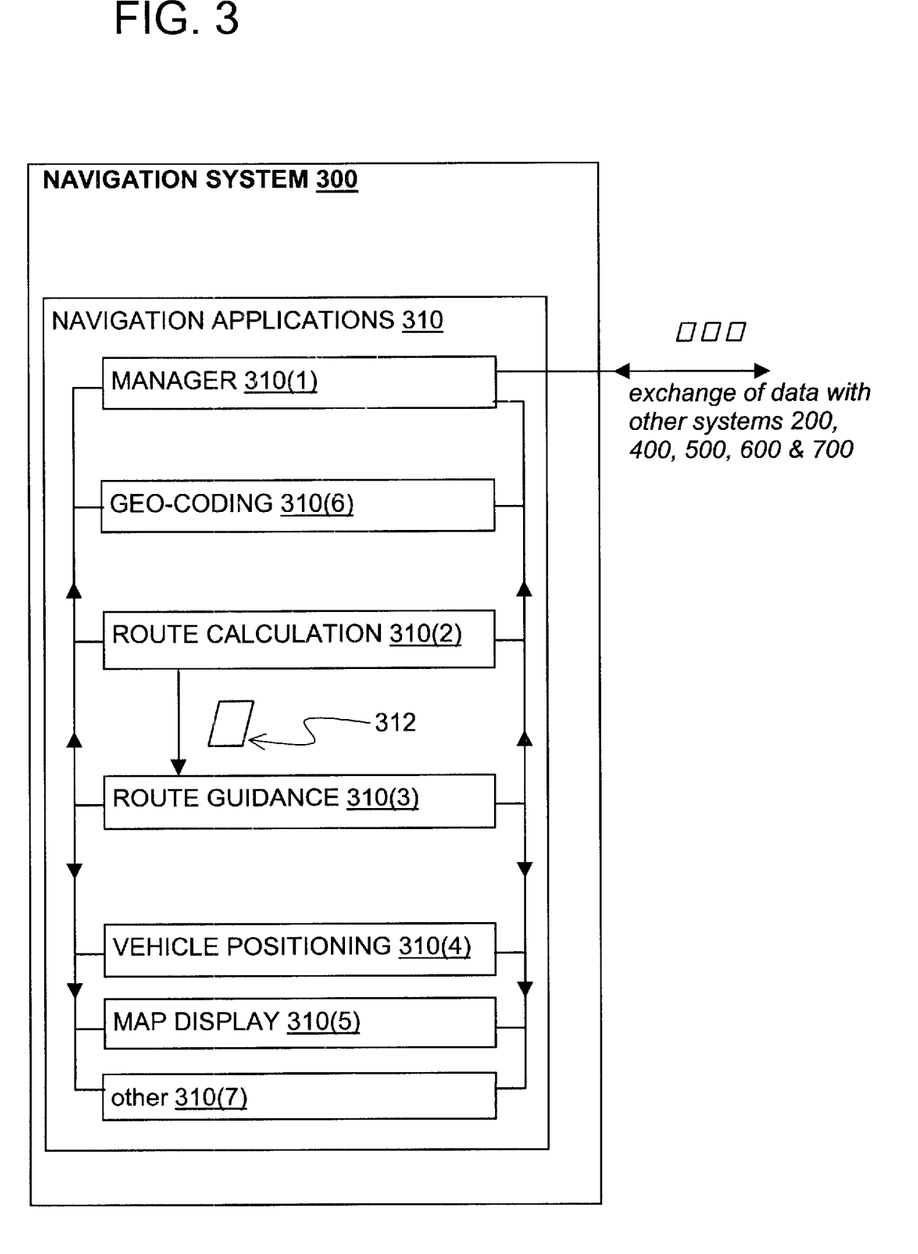
FIG. 3 is a block diagram illustrating some of the component applications included among the navigation system shown in FIG. 1.

FIG. 3 shows component applications 310 of the navigation system 300 shown in FIG. 1. The component applications 310 of the navigation system 300 are comprised of separate software programs or may be combined into one or more software programs. The component applications run on one or more processors or other computing units that are part of the hardware of the navigation system 300. The component applications 310 provide various navigation-related resources to the driver and/or passengers of the vehicle 108 as well to other systems in the vehicle that may need navigation-related information.

According to one embodiment, all the component applications 310 of the navigation system 300 are stored in the vehicle 108. Alternatively, portions of the component applications 310 of the navigation system 300 may be stored remotely and made available to the systems in the vehicle 108 through a wireless communication system which may be connected to the data bus 110 in FIG. 1. For example, route calculation functions can be performed by a remote application and made available to the Systems in the vehicle via a wireless communication link.

Referring to FIG. 3, included among the component applications 310 of the navigation system 300 are a manager application 310(1), a route calculation application 310(2), a route guidance application 310(3), a vehicle positioning application 310(4), a map display application 310(5), and a geo-coding application 310(6). The manager application 310(1) coordinates the functions of the other navigation applications. The manager application 310(1) also handles requests for navigation-related information from other systems in the vehicle 108, such as requests for navigation-related information from the user interface system 400. The manager application 310(1) also obtains data from other systems, such as the sensor systems 600 and the map database system 500.

Exemplary operation of route calculation feature in navigation system

As stated above, route calculation and guidance are among the functions provided by the navigation system 300. Operation of the navigation system 300 to perform route calculation and guidance is described in this example.

Referring to FIG. 1, in one embodiment, a request for route guidance may originate with the end user. The end user indicates a desired destination using components of the user interface system 400, such as a keypad or microphone. The end user may also indicate a starting location or the current vehicle position may be taken as the starting location.

Referring to the embodiment shown in FIG. 3, the manager application 310(1) in the navigation system 300 receives the input from the user interface system 500 to calculate a route. The manager application 310(1) may modify the input or perform other functions. The manager application 310(1) forwards a request to the route calculation application 310(2) to calculate a route between the origin and the destination. The request may include additional information, such as desired intermediate stops, driver preferences (e.g., avoid toll roads, etc.), a start time, etc.

In one embodiment, the origin and destination are specified to the route calculation application 310(2) relative to data in the geographic database. For example, the origin and destination may be specified at or along a road segment represented by an identified road segment data record. The manager application 310(1) may obtain an identification of the road segment data record that represents the road segment upon which the vehicle is currently located from the vehicle positioning application 310(4). The manager application 310(1) may obtain an identification of the road segment data record that represents the road segment upon which the desired destination is located from the geo-coding application 310(6). (If the end user also specifies a desired origin, the manager application 310(1) may obtain an identification of the road segment data record that represents the road segment upon which the desired origin is located from the geo-coding application 310(6).) Thus, according to this embodiment, when the manager application 310(1) requests the route calculation application 310(2) to calculate a route between a specified origin and destination, it first obtains data from the geo-coding application 310(6) and possibly the vehicle positioning application 310(4) that relates the origin and destination to data in the map database system 500. In an alternative embodiment, the functions of relating the end user specified destination and origin or the vehicle position may be performed by other routines including routines in the route calculation application 310(2).

As mentioned above, the route calculation application 310(2) may receive additional data that affects the calculation of the route. For example, the route calculation application 310(2) may receive data that specifies end-user preferences, such as avoidance of toll roads or expressways, and so on. The route calculation application 310(2) may also receive data that identifies the time of day at which the route will be started which may affect the calculation of a route. The route calculation function 310(2) may also receive data indicating intermediate stops that the end user would like to make.

Given data that identify the positions of an origin and destination, the route calculation application 310(2) calculates a route between the origin and the destination. The route calculation application 310(2) may use any of various means or algorithms for this purpose. For example, the method used may include either the A* algorithm or the Dykstra algorithm. Methods for calculating routes are disclosed in Ser. No. 08/893,201, filed Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. Any suitable route calculation method now known or developed in the future may be employed.) When determining a route to a desired destination, the route calculation application 310(2) obtains and uses data about road segments from the map database system 500.

Regardless of the method used, the objective of the route calculation application 310(2) is to develop a list identifying a continuous series of road segments that form a legally valid solution route between the origin and destination. (A "legally valid solution route" conforms to known traffic restrictions, such as one way streets, turn restrictions, etc.) The method used by the route calculation application 310(2) may be designed to optimize the solution route to meet one or more predetermined criteria. Such criteria may include the least travel time, the shortest distance, the fewest turns, etc. If the method used by the route calculation application 310(2) is designed to find a solution route that is optimized for one or more criteria, then the solution route also ideally meets these one or more criteria.

When using any of the aforementioned methods for calculating a solution route, the route calculation application 310(2) may explore several different alternative potential paths leading from the origin for inclusion in the solution route. The route calculation application 310(2) may also explore several different alternative potential paths leading back from the destination for inclusion in the solution route. Also, the route calculation application 310(2) may explore several different alternative potential paths leading from all or some of the intersections along potential portions of a solution route. For example, additional alternative paths may be identified and explored whenever an intersection having more than one valid successor road segment is encountered along an existing alternative potential solution path being explored. The number of different alternative potential solution paths can increase rapidly. According to some route calculation methods, as route calculation proceeds, some alternative potential solution paths being explored may be discarded based upon comparisons to other more promising alternative potential solution paths. According to some route calculation methods, as route calculation proceeds, further exploration of some alternative paths being explored may be suspended or deferred in favor of other, more promising, alternative potential solution paths.

As the route calculation application 310(2) evaluates different alternative potential solution paths for inclusion in the solution route, it stores data identifying the road segments included in each alternative potential solution path. The route calculation application 310(2) stores some or all of the data from the road segment data entities that represent road segments identified as being included in a potential solution path.

Referring to FIG. 3, after the route calculation application 310(2) has found a solution route, the route guidance application 310(3) provides an output 312. The output 312 contains an ordered list of entries. Each entry in the ordered list identifies a road segment that forms part of the solution route between the origin and the destination.

In a present embodiment, the output 312 created by the route calculation application 310(2) is used as an input to the route guidance application 310(3). The route guidance application 310(3) includes functions that provide detailed maneuvering instructions and explication as the vehicle is being driven along the route calculated by the route calculation application 310(2). These functions in the route guidance application 310(3) use the data from the entries in the list included in the output 312 from the route calculation application 310(2), as well as additional information obtained from the map database system 500, to develop the detailed maneuvering instructions. Methods for developing these detailed maneuvering instructions are described in copending applications Ser. Nos. 08/893,201 and 09/196, 279, the entire disclosures of which are incorporated by reference herein.

The detailed maneuver instructions developed by the functions of the route guidance application 310(3) are provided as a data output of the route guidance application 310(3). This data output of the route guidance function 310(3) is returned to the manager application 310(1). The data output of the route guidance function 310(3) may be passed directly to the user interface system 400 for presentation to the end user. Alternatively, the data output returned by the route guidance application 310(3) to the manager application 310(1) may be further processed by programming in the manager application 310(1). The presentation of route guidance information to the end user via the user interface system 400 may be in the form of audible instructions, visual textual instructions, visual graphical instructions, or any combinations of these or other types of information presentation.

D. The map database system

As stated above, the map database system 500 provides the geographic data that are used by various other systems in the vehicle 108, such as the navigation system 300 and the safety systems 200. Some of the types of geographic data used by the safety systems 200 are similar to the types of data used by the navigation system 300. Therefore, according to a preferred embodiment, the map database system 500 provides geographic data resources which are shared by the various other systems in the vehicle. (In an alternative embodiment, each system in the vehicle, such as the safety systems 200 and the navigation system 300, may have its own map database.)

Figure 4:
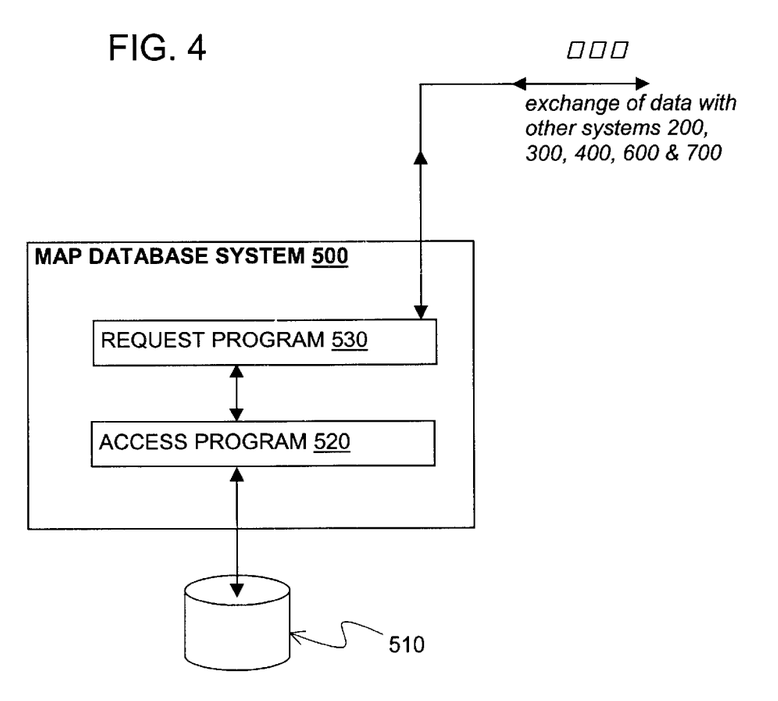
FIG. 4 is a block diagram showing components of the map database shown in FIG. 1.

Referring to FIG. 4, the map database system 500 includes one or more map databases 510. The map database system 500 includes hardware and software 520 for accessing the data in the map database 510. The map database system 500 also includes appropriate hardware and software 530 for responding to requests for geographic data from various other systems in the vehicle.

The map database 510 is stored on an appropriate storage medium, such as hard drive, CD-ROM, DVD, PCMCIA card, or any other type of storage medium. The map database 510 is preferably updatable and/or replaceable. The map database 510 may be stored in the vehicle 108 or alternatively, the map database 510 may be stored remotely and made available to the systems in the vehicle 108 through a wireless communication system which may be connected to the data bus 110 in FIG. 1. In another alternative, a portion of the map database 510 may be stored in the vehicle 108 and a portion of the map database 510 may be stored in a remote location and made available to the systems in the vehicle 108 over a wireless communication system from the remote location.

The data in the map database 510 may be organized in an appropriate manner to facilitate supporting the safety and navigation systems. Methods for organizing a map database are disclosed in U.S. Pat. Nos. 5,953,722 and 5,974,419 and copending patent application Ser. No. 08/740,295, the disclosures of which are incorporated herein by reference.

Figure 5:
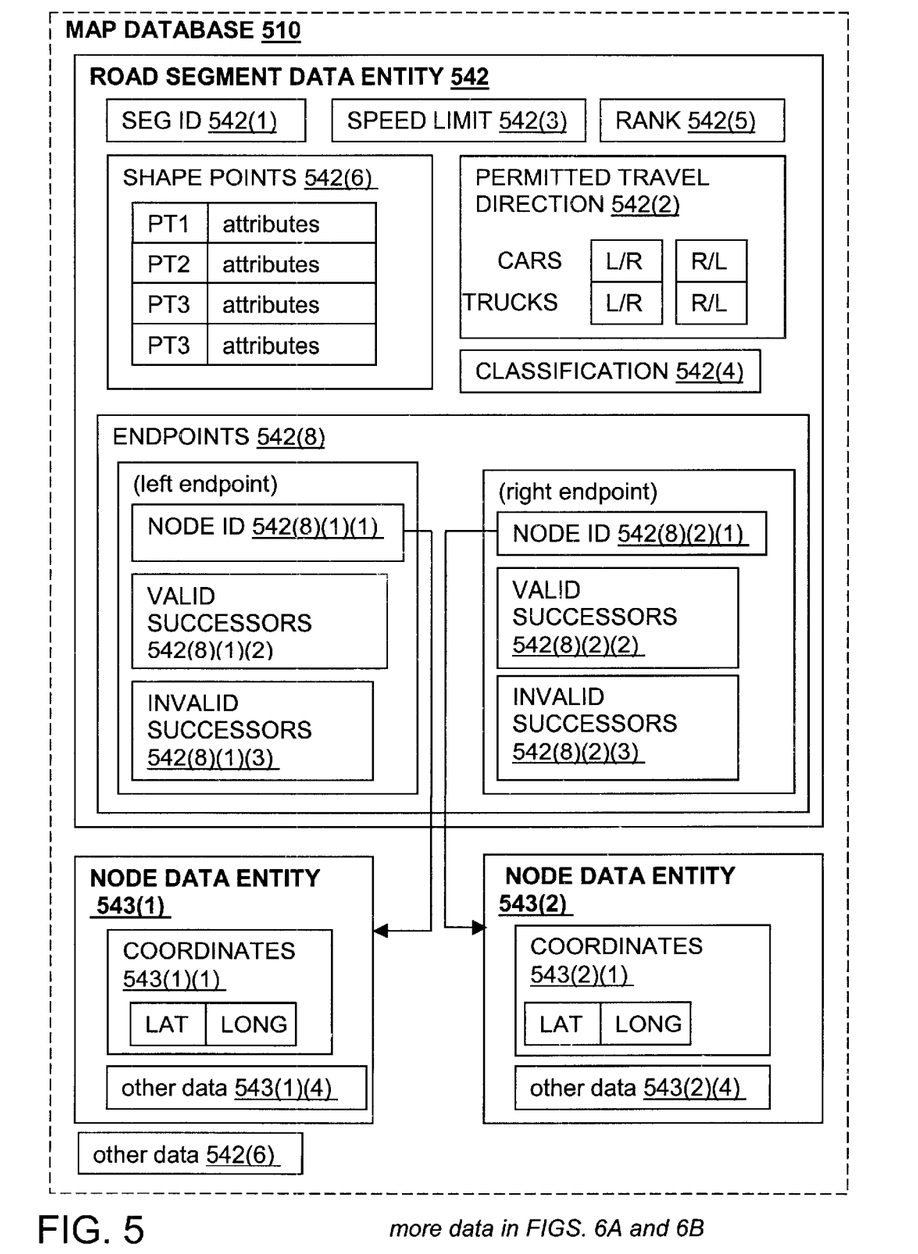
FIG. 5 is a block diagram showing attributes of one of the data entities used to represent a road segment and included in the map database shown in FIG. 1.

The geographic data in the map database 510 includes data about roads and intersections located in the geographic region in which the vehicle is traveling. (A geographic region covered by a map database 510 may include a metropolitan area, such as Los Angeles and its suburbs or New York and its suburbs, or a covered geographic region may include an entire state, an entire country, or several states or countries.) The geographic data may include information about the positions of roads and intersections in or related to the covered geographic region and may also include information about one-way streets, turn restrictions, street addresses, cost of travel factors (i.e., relative times associated with travel along various road segments), alternative routes, hotels, restaurants, museums, stadiums, offices, automobile dealerships, auto repair shops, etc. In one embodiment, each road segment in a covered geographic region is represented by one or more data entities in the map database 510. FIG. 5 shows some of the attributes of a data entity 542 that represents a single road segment.

In FIG. 5, a road segment entity 542 includes a segment ID 542(1) by which the record can be identified in the geographic database. The road segment data entity 542 also includes data 542(3) that indicates the maximum permitted vehicular speed of travel on the represented road segment record. The road segment data entity 542 also includes data 542(4) indicating whether the represented road segment is part of a controlled access road (such as an expressway), a ramp to a controlled access road, a bridge, a tunnel, a toll road, a ferry, and so on. The road segment data entity 542 also includes data 542(5) that indicates a rank of the represented road segment. (A rank of a road segment corresponds to its functional class. For example, road segments having a rank of "4" include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.)

The road segment data entity 542 also includes data, 542(8)(1)(1) and 542(8)(2)(1), identifying the endpoints of the road segment. In one embodiment, these data, 542(8)(1)(1) and 542(8)(2)(1), include references to node data entities, 543(1) and 543(2), defined for the nodes corresponding to the endpoints of the represented road segment. By convention, each road segment is considered to have a "left" node and a "right" node. The left node may be the node having greater longitudinal coordinates, or in the case in which the longitudinal coordinates are the same, the node having the lesser latitude. (Of course, which node is defined as the left or right node can be alternatively defined.) Each node data entity 543 includes data, 543(1)(1) or 543(2)(1), identifying the geographic coordinates (e.g., the latitude, longitude, and optionally altitude) of the represented endpoint.

Also associated with the road segment data entity 542 are data 542(8)(1)(2) and 542(8)(2)(2) indicating valid successor segments (if any) at each of the endpoints of the represented road segment. A valid successor segment is a road segment to which vehicular travel is legally permitted from the represented road segment. Also associated with the road segment data entity 542 are data 542(8)(1)(3) and 542(8)(2)(3) indicating invalid successor segments (if any) at each of the endpoints of the represented road segment. An invalid successor segment is a road segment to which vehicular travel is not legally permitted from the represented road segment.

The road segment data entity 542 also includes data 542(2) that indicate which direction on the represented road segment each of a plurality of different types of vehicles (or non-vehicles) are legally permitted to travel. For example, with respect to automobile traffic, there are two data fields, labeled "L/R" and "R/L." These data fields are used to indicate whether automobile traffic is permitted on the represented road segment in the direction from the left node to the right node of the segment and from the right node to the left node, respectively. There may be separate data fields for trucks and other modes of transportation. In addition, there may be separate data fields for weight classes of trucks.

The road segment record 542 may also include or be associated with other data 542(6) that include or refer to various other attributes of the represented road segment, such as the street address range along the represented road segment, the name of the road of which the represented road segment is a part, the highway designation of the road of which the road segment is a part, and so on.

In one embodiment, the geographic data are developed and provided by Navigation Technologies Corporation of Rosemont, Ill., however it is understood that data developed and provided by other entities may also be suitable for use with the inventive subject matter disclosed herein.

As stated above, the safety systems 200 in FIG. 2 use data from the map database system 500 and data from the sensor systems 600 to provide various safety-related features. As demonstrated by the descriptions of the various safety systems 200, these various systems use different kinds of data. For example, the headlight aiming system 210(1) requires data from the map database system 500 related to the road curvature ahead of the vehicle. The lane departure warning system 210(6) requires data from the map database system 500 related to the lane width and the number of lanes along the vehicle path. The intersection warning system 210(5) requires data from the map database system 500 related to the locations of intersections.

In addition to the need for different kinds of road-related data attributes, the various safety systems 200 may also have different requirements for data accuracy. For example, the headlight aiming system 210(1) may require that the road geometry data (i.e., geographic coordinates and road curvature attributes) be accurate to ±5 meters, whereas the lane departure warning system 210(6) may require that the road geometry data be accurate to within ±1 meter. (A system that needs data of a lower accuracy level can use data of a higher accuracy level.)

Collecting all the different kinds of data attributes needed by all the safety systems for all the roads in a covered geographic region would be a significant undertaking. Additionally, collecting data attributes with the highest levels of accuracy needed by any of the safety system for all the roads in a covered geographic region would also be significant. If the installation and use of safety systems were deferred until all the data attributes needed by all the safety systems were obtained with the highest needed accuracy, significant benefits in avoided property damage and personal injury would be lost. Accordingly, it would be beneficial to implement some or all of these safety systems 200 even if only some of the roads in a covered geographic region were represented by data attributes of the type and level of accuracy sufficient to enable some of the safety systems 200.

According to a present embodiment, some of the roads in a covered geographic region represented by data in the map database 510 that enable use of one or more of the safety systems 200 in the vehicle that use map data and other roads in the covered geographic region are represented by data in the map database 510 that do not enable use of one or more of the safety systems 200 in the vehicle that use map data. The data that enable use of a safety system may be a type of data attribute needed by the safety system, such as lane width data. Alternatively, the data that enable use of a safety system may be a data attribute of a specific level of accuracy, such as geographic coordinates ±1 meter in accuracy.

Figure 6A:
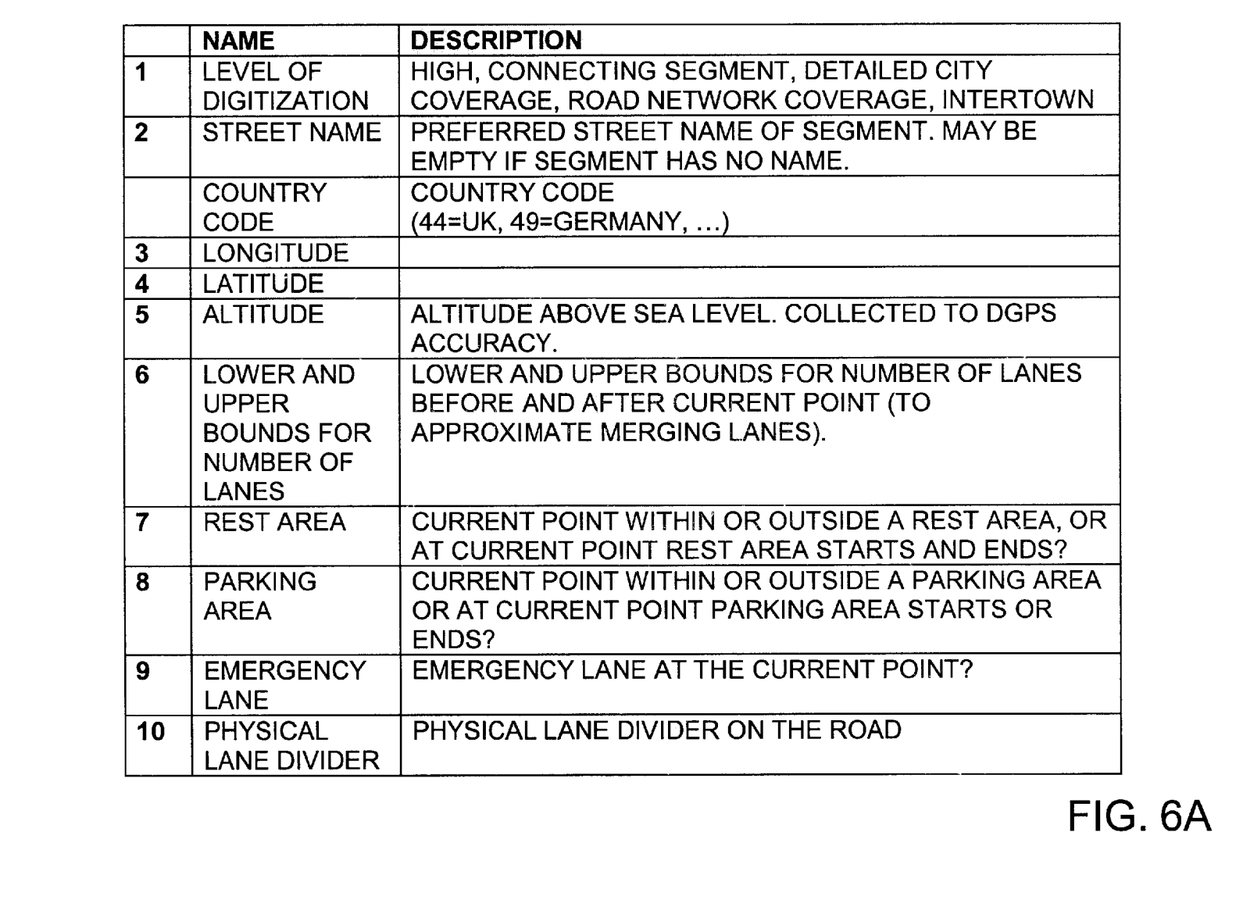
FIGS. 6A and 6B are tables showing additional attributes of one of the data entities used to represent a road segment and included in the map database shown in FIG. 1.
Figure 6B:
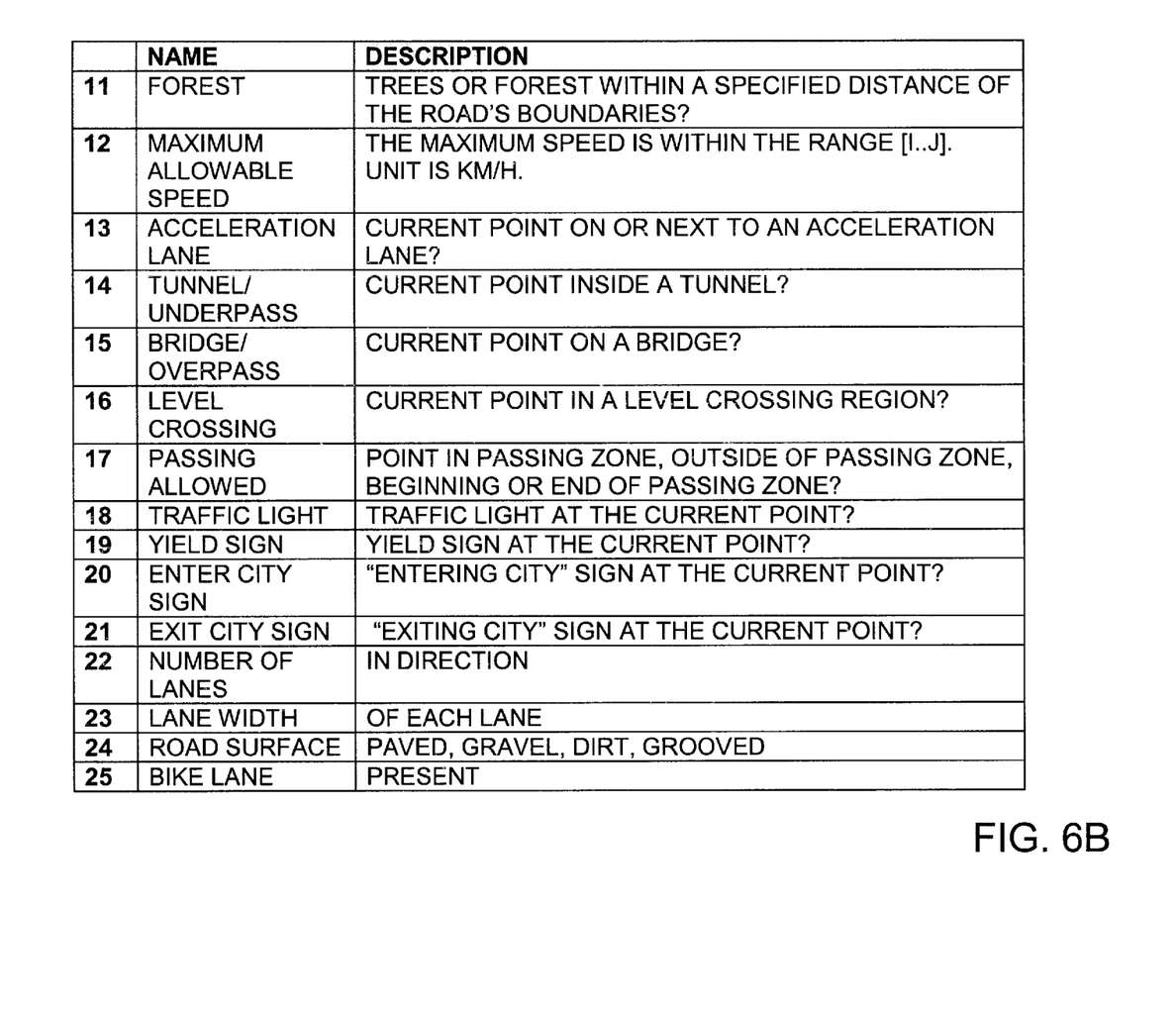

FIGS. 6A and 6B show some additional data attributes associated with the representation of a road segment the map database 510. Some of the road segments represented in the map database 510 include data for all the attributes shown in FIGS. 6A and 6B. However, other road segments represented in the map database 510 do not include all the data attributes shown in FIGS. 6A and 6B.

II. Safety Favored Routes

A. Basic implementation with route calculation

As mentioned above, not all road segments represented in the map database 510 are represented with the data attributes needed by the one or more safety systems 200 in the vehicle 108. According to the present embodiment, when the navigation system 300 is used to calculate a route to a desired destination, the route calculation application 310(2) favors the inclusion of road segments represented by data for which one or more of the safety systems are enabled.

As stated above, the route calculation application 310(2) can be configured to favor different kinds of routes. The route calculation application 310(2) can use any of various means to favor safety system-enabled routes when determining a solution route to a desired destination. One way that the route calculation application can use is to increase the travel cost of roads that are represented by data that does not enable the safety systems.

When determining which road segments to favor, the route calculation application 310(2) can assess the data that represents a road segment and determine whether the data attributes needed for enabling the safety systems are present for that represented road segment in the map database 510. If the data attributes needed for enabling the safety system are present in the map database with respect to a particular road segment, then that road segment is favored for inclusion in a solution route. On the other hand, if the data attributes needed for enabling the safety system are not present in the map database with respect to a particular road segment, then that road segment is not favored for inclusion in a solution route.

B. Implementation with multiple safety systems

As mentioned above, the various different safety systems may need different kinds of data or data with different levels of accuracy. Data that enables use of one safety system may not enable use of another safety system. In a database that represents all the roads in a geographic region, some of the roads may be represented by data that enables one safety system and other roads may be represented by data that enables a different safety system. In this case, the route calculation application implements a set of rules for favoring road segments. One rule assigns a priority to certain safety systems over other safety systems. According to this rule, if two road segments are available for travel in a solution route and one road segment is represented by data that enables one safety system and the other road segment is represented by data that enables another safety system, the road segment is favored that is represented by data that enables the higher priority safety system. For example, an obstacle avoidance safety system may be favored over a headlight aiming system.

Another rule takes other factors into account. Application of this rule to the automatic headlight aiming safety system is one example. If two road segments are available for travel in a solution route and one road segment is represented by data that enables the automatic headlight aiming safety system and the other road segment is represented by data that enables another safety system and the vehicle is traveling in bright, sunlight conditions, the road segment that is represented by data that enables the automatic headlight aiming system is not favored over the other system.

Another rule that can be applied takes into account the number of safety systems that are enabled. According to this rule, if two road segments are available for travel in a solution route and one is represented by data that enables two safety systems and the other road segment is represented by data that enables only one safety system, the road segment is favored that is represented by data that enables the two safety systems.

Another rule combines a priority assigned to each safety system with the number of safety systems that are enabled. According to this rule, assume that a first safety system is assigned a priority value of 10, a second safety system is assigned a priority value of 5 and a third safety system is assigned a priority value of 3. If two road segments are available for travel in a solution route and one is represented by data that enables the second and third safety systems and the other road segment is represented by data that enables the first safety system only, the road segment is favored that is represented by data that enables the first safety system because the combined priority values of the second and third safety systems (e.g., 5+3) do not exceed the priority value of the first safety system (e.g., 10).

Another rule that can be applied takes into account the overall percentage of the route represented by data that enables at least one safety system. According to this rule, road segments are favored in a solution route that connect to other road segments that are represented by data that enable a safety system. According to this rule, the percentage of the route on roads that do not enable any safety system is minimized.

Another rule that can be implemented is that roads that enable a safety system are favored so long as the safety-system-favored road does not increase the cost of travel by more than a threshold amount (e.g., 100%). The threshold is preferably configurable.

Various other rules can be formulated. Any of the above rules can be combined in various ways by assigning weighting factors.

C. Use of safety system enablement attribute

Figure 7:
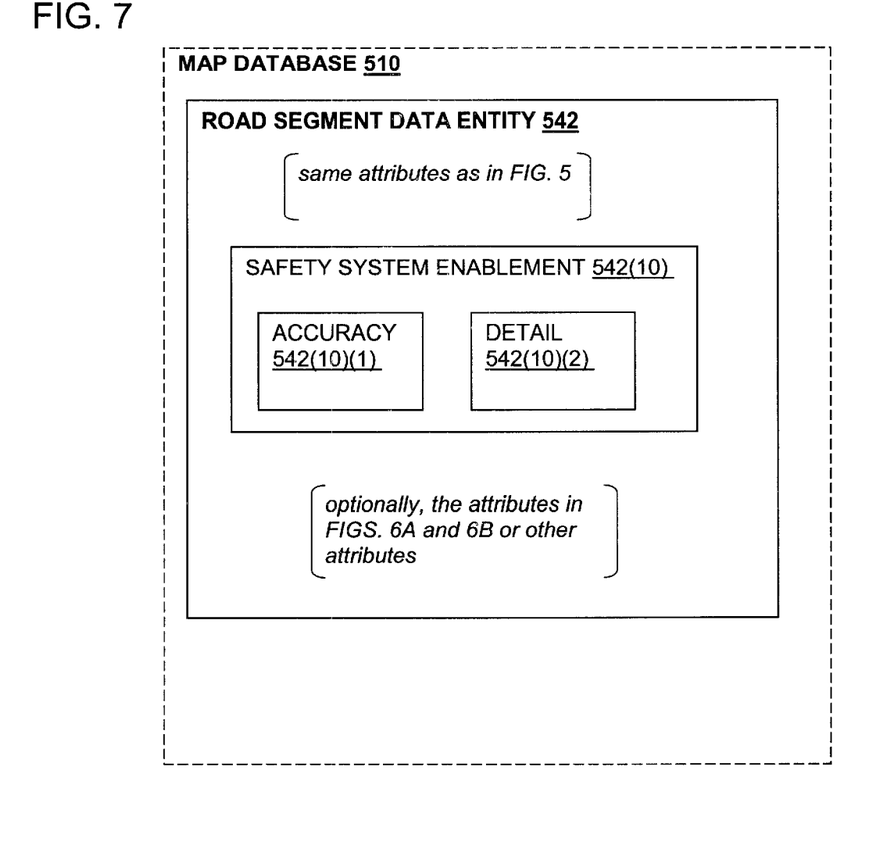
FIG. 7 is a block diagram showing attributes of an alternative embodiment of one of the data entities used to represent a road segment and included in the map database shown in FIG. 1.

As stated above, one way that the route calculation system 310(2) can determine which roads enable safety systems is to examine the data attributes associated with each road segment to determine whether those data attributes needed by one or more vehicle safety systems are present in the map database 510 with respect to a represented road. Another way to determine which roads enable safety systems is to include data in the geographic database 510 that specifies this information. According to one embodiment, a safety system enablement attribute is included with each data entity that represents a road segment. The safety system enablement attribute indicates a level of safety system enablement. According to this embodiment, the safety system enablement attribute is computed by the map database publisher and stored as an attribute associated with data entities that represent roads in the map database 510. The safety system enablement attribute is computed taking into account various factors. FIG. 7 shows a diagram of data entity used to represent a road segment wherein the data entity includes data a safety system enablement attribute 542(10).

According to the embodiment shown in FIG. 7, the safety system enablement attribute 542(10) includes two components: an accuracy component 542(10)(1) and a detail component 542(10)(1). Each component includes 4 levels. Each level of each component defines a level of safety system enablement. The level indicated by each component of the safety system enablement attribute 542(10) indicates that the other data attributes associated with the data entity 542 conform at least to the specified level. For example, an accuracy component 542(10)(1) specifying a level of "0" indicates that the other data attributes of the associated data entity 542(10) do not enable any safety systems. An accuracy component 542(10)(1) specifying a level of "1" indicates that the other data attributes of the associated data entity 542 are accurate to ±5 meters. An accuracy component 542(10)(1) specifying a level of "2" indicates that the other data attributes of the associated data entity 542 are accurate to ±1 meters. A detail component 542(10)(2) having a level of "0"indicates that the other data attributes of the associated data entity 542 do not enable any safety systems. A detail component 542(10)(2) having a level of "1" indicates that the other data attributes of the associated data entity 542 include all the attributes listed in FIGS. 6A and 6B. A detail component 542(10)(2) having a level of "2" indicates that the other data attributes of the associated data entity 542 include specific attributes in addition to those in FIGS. 6A and 6B.

The route calculation application 310(2) can use the safety system enablement attribute 542(10) to determine which safety systems are enabled along a particular road segment. For example, if the headlight aiming system 210(1) requires that the data attributes representing a road be accurate ±5 meters and that the attributes listed in FIGS. 6A and 6B be present, then the heading aiming system 210(1) would be enabled along roads that represented by data entities for which the accuracy component of the safety system enablement attribute 542(10) is at least 1 and the detail component of the safety system enablement attribute 542(10) is at least 1. (If either of these components were greater than 1, the automatic headlight aiming system 210(1) would also be enabled.)

The safety system enablement attribute was described above as having two components of four levels each. In alternative embodiments, the safety system enablement attribute can have more components or can have a single component. Additionally, each component of the safety system enablement attribute can have more or fewer levels. The map database 510 can include a safety system enablement attribute with all data entities that represent road segments, or alternatively, the map database 510 can include the safety system enablement attribute with only some of the data entities that represent road segments (i.e., the lack of a safety system enablement attribute indicating that the represented road segment does not enable any safety systems).

When the map database 510 includes a safety system enablement attribute associated with some or all of the data entities that represent road segments, the route calculation application 310(2) can use the safety system enablement attribute to determine which roads to favor in solution routes. The route calculation application 310(2) can favor routes that enable safety systems by using the safety system enablement attribute as a factor of the cost of travel along a road segment. Using the safety system enablement attribute level as a factor automatically favors more safety systems because safety systems enabled at a lower safety system enablement attribute level would also be enabled by higher safety system enablement attribute levels.

In another embodiment, the safety system enablement attribute can be combined or associated with other attributes. For example, all road having a rank of 4 (i.e., the rank attribute 542(5) in FIG. 5) can also have specified level of accuracy and/or detail. Then, according to this embodiment, all safety systems that require this specified level of accuracy and/or detail would be enabled on rank 4 roads. If the safety system enablement attribute were combined with the rank attribute in this manner, a separate safety system quality attribute would not be needed.

D. Alternative embodiments

According to an embodiment described above, when the vehicle driver requests the navigation system 300 to determine a route to a desired destination, the route calculation application 310(2) determines a solution route that favors roads that enable operation of the vehicle safety systems 200. In alternative embodiments, a function that identifies roads that enable operation of one or more of the vehicle safety systems can operate even when the driver has not requested a route to a desired destination. This function can be implemented as a standalone application in the navigation system 300 or the safety systems 200 or can be implemented as part of another system or application.

(1). Interactive embodiment. In one embodiment, the identification of safety-system-enabled roads is implemented interactively. When implemented in this manner, the function may be part of the route guidance application 310(3) or alternatively, the function may be part of the safety systems 200. If implemented as part of the safety systems 200, the function may use routines in the route calculation application 310(2) and/or route guidance application 310(3).

According to this embodiment, the driver has not requested the navigation system 300 to calculate a route to a desired destination. Instead, the driver is following a route "on his/her own." While the driver is following his/her own route, the safety-enabled roads identification function operates in the background. The safety-enabled roads identification function evaluates various alternative paths ahead of the vehicle. For example, as the driver is driving along a road segment, the safety-enabled roads identification function evaluates all possible maneuvers at the upcoming intersection (e.g., turn left, turn right, go straight). For each of these maneuvers, the safety-enabled roads identification function may also evaluate the possible maneuvers at successor intersections, and so. For each of these possible paths, the safety-enabled roads identification function determines which paths include road segments that are represented by data for which one or more safety systems are enabled. Then, as the driver is following his/her own route, the driver is provided with guidance (via the user interface 400) about which paths ahead of the vehicle are safety-enabled. For example, if the vehicle is approaching an intersection and the road to the right is represented by data that enables one or more safety systems and the road straight ahead does not enable any safety systems, the driver would be presented with a message (via the user interface) that the road to the right is preferred based upon enabling the safety systems. Of course, if the road to the right does not lead to where the driver is going, the driver would not choose to turn right. However, if the driver considered both paths to be acceptable, then the driver would be provided with information that could be used to select the safer path.

(2). Heuristic embodiment. In another mode of operation, the safety-enabled roads identification feature operates heuristically. The heuristic embodiment of the safety-enabled roads identification feature automatically learns the driver's traveling schedule over time, identifies destinations that the driver regularly visits, and then determines new routes to the regularly-visited destinations wherein the new routes favor road segment for which the safety systems are enabled. This feature preferably takes into account travel at certain times of day and on certain days of the week. For example, suppose a driver leaves for his office located at 333 North Wacker Driver in Chicago every weekday morning between 7:00 AM and 8:00 AM from his home in at 670 Ridge Road in Park Ridge, Ill. and then drives home between 5:00 PM and 6:00 PM every afternoon. Because the driver is familiar with the route, he may not use the navigation system 300 in the vehicle to calculate a route. However, the safety-enabled roads identification feature in the vehicle operates in the background and monitors the driver's traveling schedule and destinations. When a destination is visited several times without use of the route calculation application 310(2), particularly when the visits are associated with specific times of day or days of the week, the safety-enabled roads identification feature calculates a route to the frequently visited destination. The route calculated by the safety-enabled roads identification feature favors roads that are represented by data for which one or more of the safety systems are enabled. The safety-enabled roads identification feature then compares this route to the one or more routes that the driver usually takes to the destination. If the calculated route is substantially safer, the driver is informed (via the user interface) that a route that uses roads represented by data for which one or more of the safety systems are enabled is available. The driver may be presented with this information at an appropriate time, such as when the driver embarks on the usual route.

The embodiment can operate for any kind of frequently taken trip. For example, if a person frequently visits a particular restaurant at lunchtime or if the person drives to a gymnasium on Saturday mornings.

E. Insurance incentive embodiment

In another embodiment, drivers who use roads for which the vehicle safety systems are enabled are rewarded with financial incentives. According to this embodiment, automobile insurance companies provide discounts or lower rates to drivers who have systems that inform them of routes for which the vehicle safety systems are enabled and who tend to use such routes. According to this embodiment, a means is provided by which a driver's use of safety system-enabled roads is confirmed. Referring to FIG. 1, included among the vehicle systems is the traveling log system 700. The traveling log system 700 operates similarly to a flight data recorder in an airplane. The traveling log system 700 records data that monitors operation of various vehicle systems. According to the present embodiment, the traveling log system 700 monitors the vehicle driver's use of roads for which the safety systems are enabled. This information is stored in the log system 700 so that a record of the vehicle's operation over several months can be obtained. The purpose of the record is to determine whether the driver followed routes for which the safety systems were enabled when recommended to do so by the navigation system (or another system within the vehicle). If the driver tended to follow safety-enabled routes recommended by the navigation system, the driver obtains a high compliance percentage. The data from the travel log system 700 would be available to insurance companies. Drivers with high compliance percentages would be rewarded with lower rates or discounts on their insurance premiums. On the other hand, if a driver tended not to follow the safety-enabled routes recommended by the navigation system, the driver would obtain a low compliance percentage and would not be entitled to lower rates or discounts. In this manner, drivers who tended to drive to destinations for which safety system enabled routes were not available would not be penalized. On the other hand, if a driver tended to ignore recommendations to follow safety-system enabled routes, even when such routes were available, such a driver would not be entitled to insurance discounts or incentives.

According to another alternative, a driver's insurance rates are based on the percentage of roads traveled that are safety-enabled roads. For example, if a driver chooses to travel on safety-enabled roads 50% of the time such roads are available, the driver would be entitled to 50% of the discount. Alternatively, a driver's rates can be based on the total number of safety-enabled roads traveled and the total number of non-safety-enabled roads traveled. For example, according to this embodiment, a driver would pay 2 ¢ a mile for all miles traveled on safety-enabled roads and 4 ¢ a mile for all miles traveled on non-safety-enabled roads. Various other combinations can be formulated.

III. Advantages

It is recognized that favoring roads represented by data for which the safety systems are enabled does not necessarily provide the fastest route. Following route for which the safety systems are enabled may take more time than a route optimized for least travel time. However, by staying on roads that are optimized for safety (as opposed to optimized for speed), the vehicle owner benefits from reducing the risk of accident.

It is intended that the foregoing detailed description be regarded as illustrative rather than limiting and that it is understood that the following claims including all equivalents are intended to define the scope of the invention.

I claim:

1. A method of decreasing vehicular accidents comprising:
   providing auto accident insurance for a plurality vehicles, wherein each vehicle of said plurality of vehicles comprises:
   a vehicle safety system that provides a safety-related function using data from a map database; and
   a navigation system that uses data from said map database to determine routes to desired destinations and provides guidance to a vehicle driver to follow said routes, wherein said routes favor roads upon which said safety system is enabled; and
   providing lower insurance rates for said plurality of vehicles,
   whereby drivers can be encouraged to drive on roads upon which safety systems are enabled.

2. The method of claim 1 wherein said vehicle safety system comprises adaptive cruise control.

3. The method of claim 1 wherein said vehicle safety system comprises automatic headlight aiming.

4. The method of claim 1 wherein said vehicle safety system comprises obstacle warning.

5. The method of claim 1 wherein said map database is installed in said vehicle.

6. The method of claim 1 wherein said vehicle further comprises a driving history log that records data from which compliance with said guidance can be determined, and wherein said method further comprises the step of:
   confirming compliance with said guidance as a factor when providing lower insurance rates.

7. A method of providing a user of a motor vehicle with a route to a destination using a vehicle navigation system, comprising the steps of:
   receiving input that indicates a destination;
   accessing a map database to obtain data representing roads in a region in which the motor vehicle is operating, wherein some of said roads are represented by data that enables operation of a vehicle safety system and others of said roads are represented by data that does not enable operation of the vehicle safety system, and further wherein said map database includes data that distinguish the roads represented by data that enable operation of the vehicle safety system from the roads represented by data that does not enable operation of the vehicle safety system; and
   calculating a route to the destination, wherein as part of said step of calculating, the data that distinguish the roads represented by data that enable operation of the vehicle safety system from the roads represented by data that does not enable operation of the vehicle safety system are used to favor roads that enable said safety system for inclusion in said route over roads that do not enable operation of said safety system.

8. The method of claim 7 wherein said input is received heuristically by monitoring commonly visited destinations of the motor vehicle over time.

9. The method of claim 7 wherein said input is obtained from the user via a user interface of the motor vehicle.

10. The method of claim 7 further comprising the step of:
    advising the user of the route to the destination.

11. The method of claim 7 wherein said data representing roads includes an attribute that indicates a quality level associated with data representing an associated portion of said roads, wherein said vehicle safety system is enabled when traveling on roads represented by data having a specified quality level as indicated by said attribute.

12. The method of claim 11 wherein said attribute includes an accuracy component and a detail component.

13. The method of claim 12 wherein at least one of said components includes at least four levels of quality.

14. The method of claim 7 further comprising the step of:
monitoring whether the motor vehicle follows said route to the destination.

15. The method of claim 14 further comprising the step of:
storing data in a log in said motor vehicle indicating whether the motor vehicle has followed said route to the destination.

16. The method of claim 7 wherein said vehicle safety system comprises adaptive cruise control.

17. The method of claim 7 wherein said vehicle safety system comprises automatic headlight aiming.

18. The method of claim 7 wherein said vehicle safety system comprises obstacle warning.

19. The method of claim 7 wherein said map database is installed in said motor vehicle.

20. The method of claim 7 wherein said map database is located remotely and said data is transmitted wirelessly to said motor vehicle.

21. A method of operating a motor vehicle, wherein the motor vehicle includes at least one safety system that detects an area around the motor vehicle and that uses a map database that includes data that represent roads on which the motor vehicle is operating, wherein some of said roads are represented by data that enable operation of the at least one vehicle safety system and others of said roads are represented by data that does not enable operation of the at least one vehicle safety system, and further wherein said map database includes data that distinguish the roads represented by data that enable operation of the at least one vehicle safety system from the roads represented by data that does not enable operation of the at least one vehicle safety system, the method comprising:

as the motor vehicle is being driven along roads, determining alternative paths ahead of the motor vehicle that the motor vehicle can follow;

using the data that distinguish the roads represented by data that enable operation of the at least one vehicle safety system from the roads represented by data that does not enable operation of the at least one vehicle safety system to determine which of said paths enable operation of said at least one safety system; and advising a driver of said motor vehicle of results of said evaluating.

22. A secondary safety system for a vehicle comprising:

a map database that contains data representing roads;

a primary vehicle safety system that uses data in the map database to provide a safety feature for the vehicle, wherein some of the roads are represented in the map database by data of a quality or type that enables operation of the primary vehicle safety system and others of the roads are represented in the map database by data of a quality or type that does not enable operation of the primary vehicle safety system, and further wherein said map database includes data that distinguish the roads represented by data that enable operation of the primary vehicle safety system from the roads represented by data that does not enable operation of the primary vehicle safety system; and a navigation system that determines routes to desired destinations using data in said map database, wherein said navigation system uses the data that distinguish the roads represented by data that enable operation of the primary vehicle safety system from the roads represented by data that does not enable operation of the primary vehicle safety system to favor inclusion of roads in said routes that enable operation of said primary vehicle safety system.

23. The invention of claim 22 wherein said primary vehicle safety system comprises adaptive cruise control.

24. The invention of claim 22 wherein said vehicle safety system comprises automatic headlight aiming.

25. The invention of claim 22 wherein said primary vehicle safety system comprises obstacle warning.

26. The invention of claim 22 wherein said map database is installed in said motor vehicle.

* * * * *